United States Patent [19]

Shu

[11] 4,400,745
[45] Aug. 23, 1983

[54] TAPE TRANSPORT

[75] Inventor: Stephen K. Shu, Fountain Valley, Calif.

[73] Assignee: Del Mar Avionics, Irvine, Calif.

[21] Appl. No.: 207,626

[22] Filed: Nov. 17, 1980

[51] Int. Cl.³ .................... G11B 15/52; G11B 15/43
[52] U.S. Cl. ........................................ 360/73; 360/71
[58] Field of Search ................... 360/73, 71; 242/186

[56] References Cited

U.S. PATENT DOCUMENTS

| | | | |
|---|---|---|---|
| 3,596,005 | 7/1971 | Hamilton | 360/73 |
| 3,913,134 | 10/1975 | Sargunar | 360/73 |
| 3,990,108 | 11/1976 | Suga et al. | 360/73 |
| 4,156,257 | 5/1979 | Roberts | 360/73 |
| 4,163,532 | 8/1979 | Sakai | 360/73 |

Primary Examiner—Robert S. Tupper
Attorney, Agent, or Firm—Beehler, Pavitt, Jagger, Siegemund & Martella

[57] ABSTRACT

Magnetic tape transport using DC current drive variable speed motors directly coupled to take-up and supply reels between which a tape is moved under tension. A crystal controlled PLL is referenced to a tape reference signal during steady speed operation and to a tape drive tachometer signal during start, stop and speed change cycles. The PLL controls the take-up motor drive amplifier which has a current drive output for developing motor torque. A second tension servo loop controls the supply reel motor drive amplifier which also supplies a current drive amplifier to develop motor torque. The tension servo loop has a major feedback signal component C2 which sums the motor currents as representative of the sum of the torques in the motors and the tension resulting in the tape. Additional tension components representing a steady bias C1, a take-up follower C3 and rapid deceleration signal C4 are also employed.

6 Claims, 22 Drawing Figures

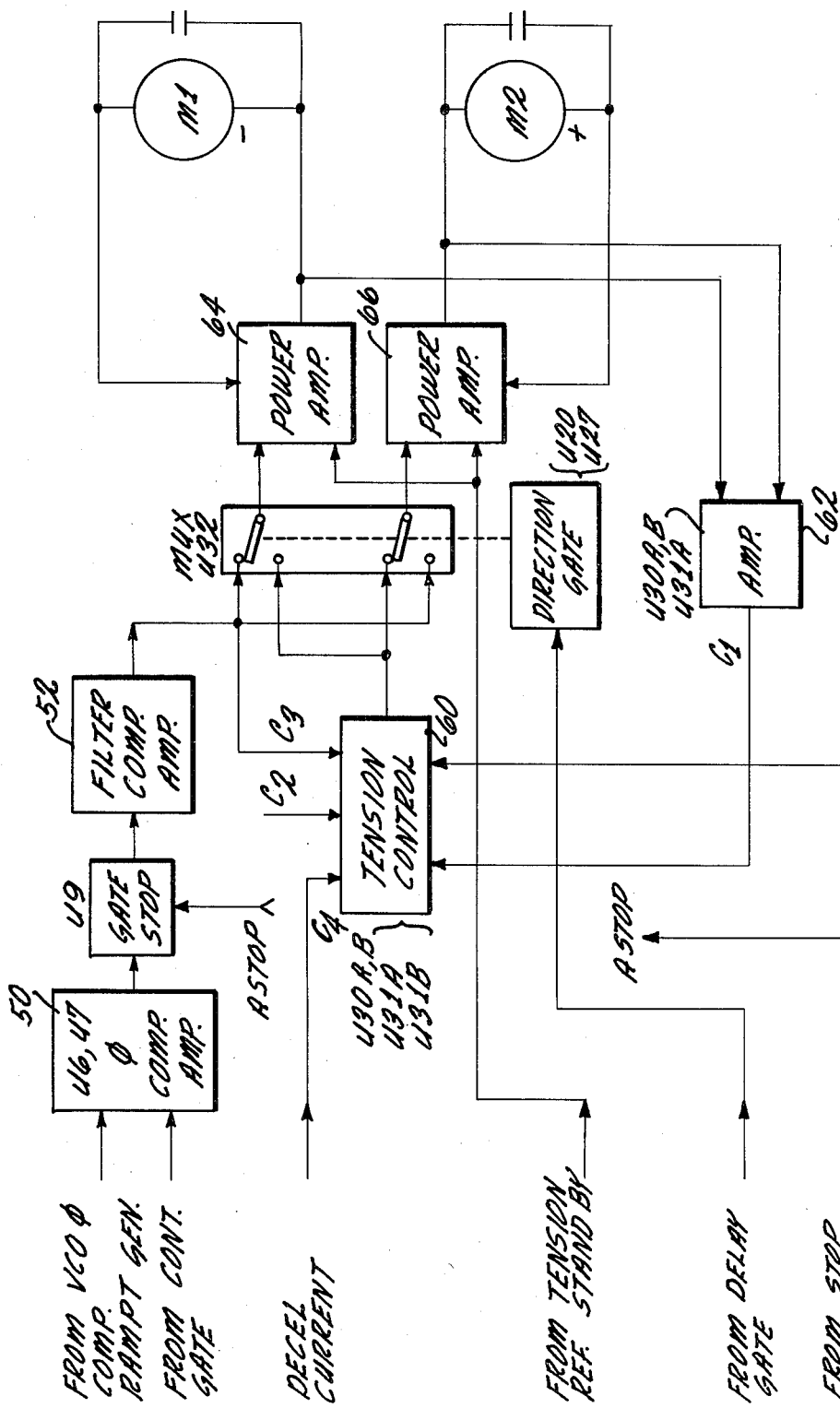

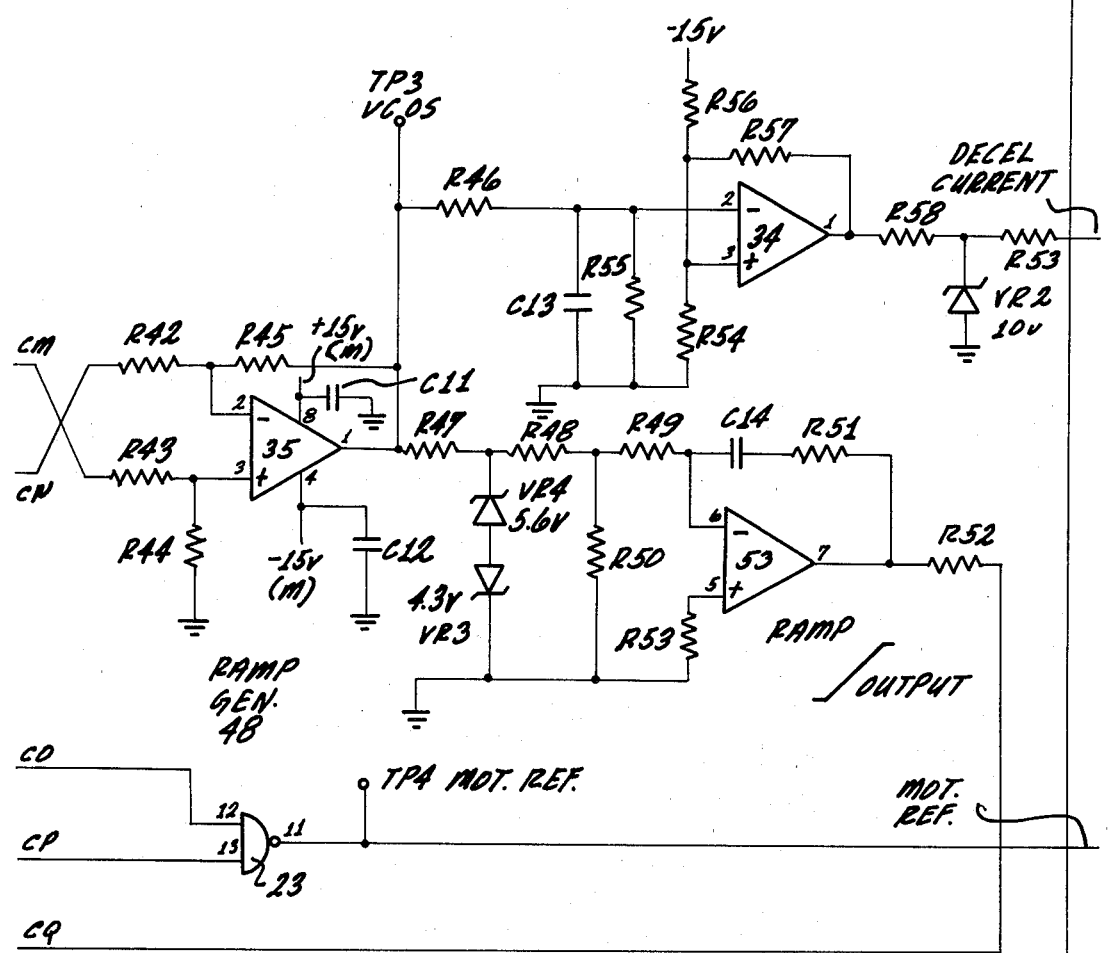
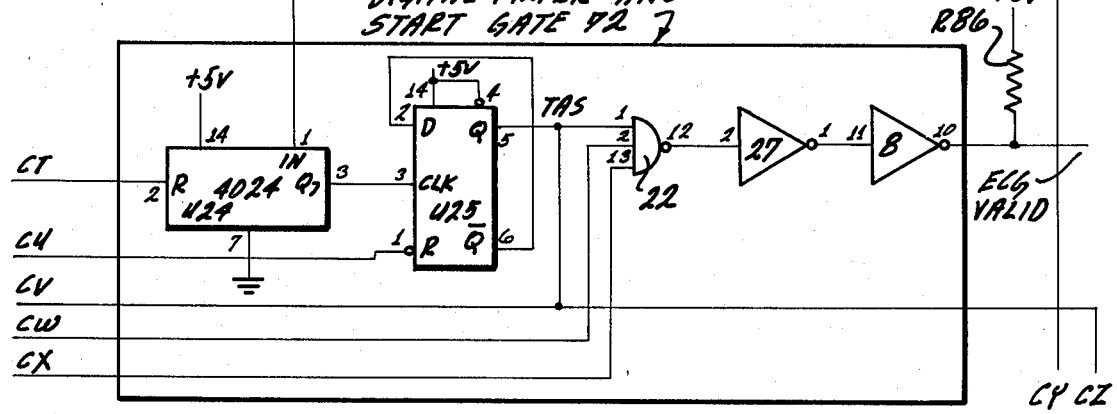
FIG. 3C

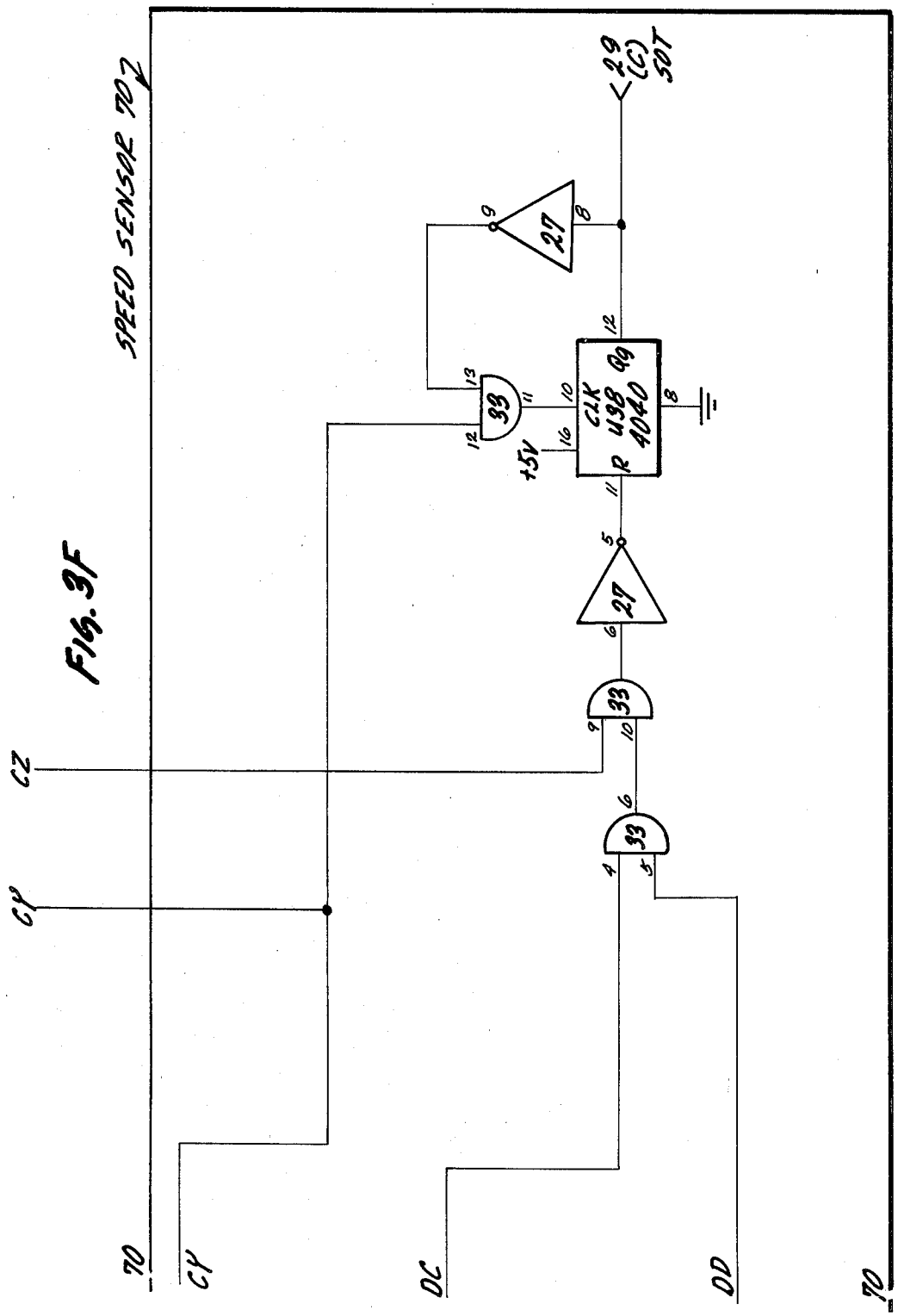

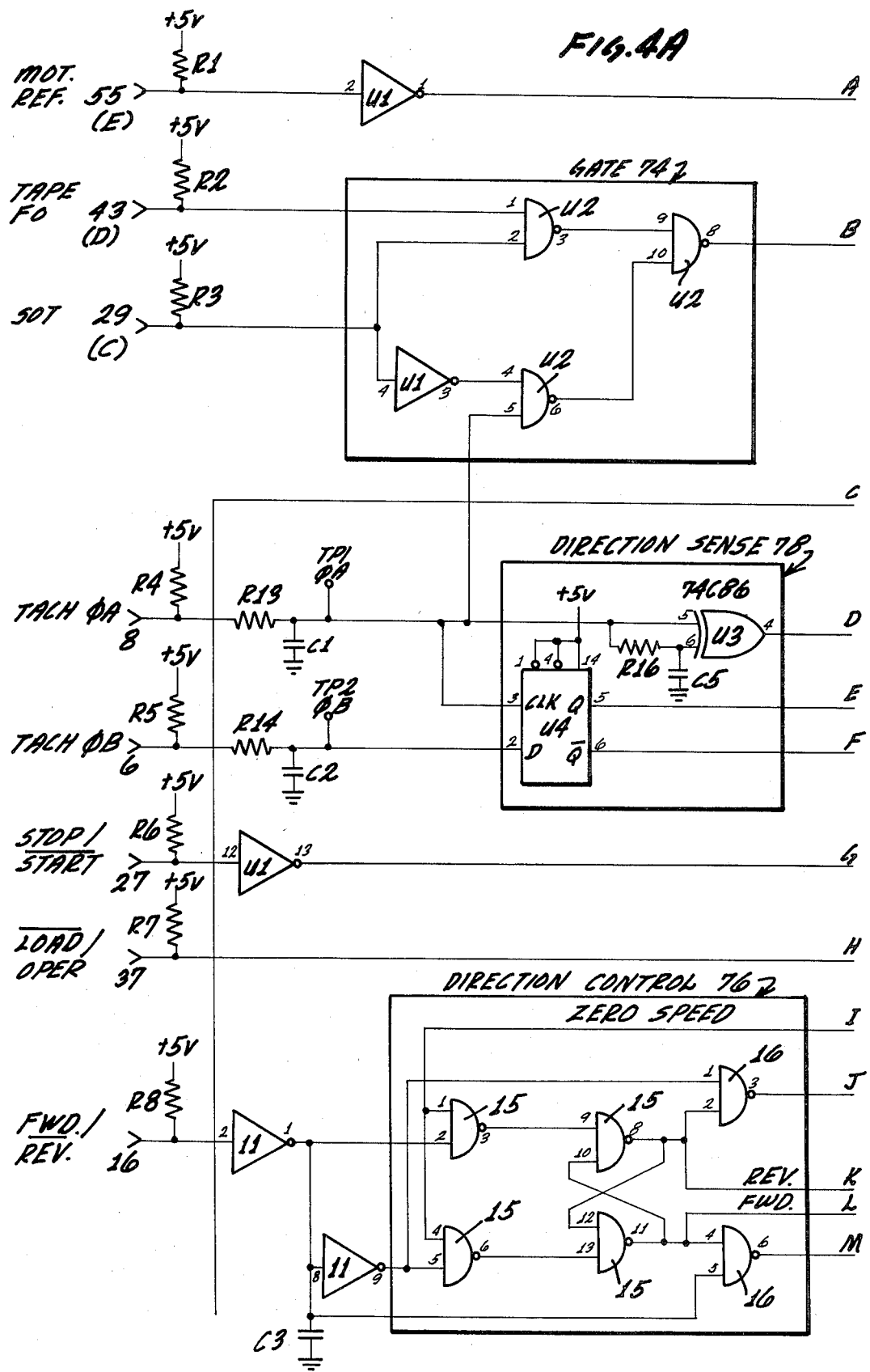

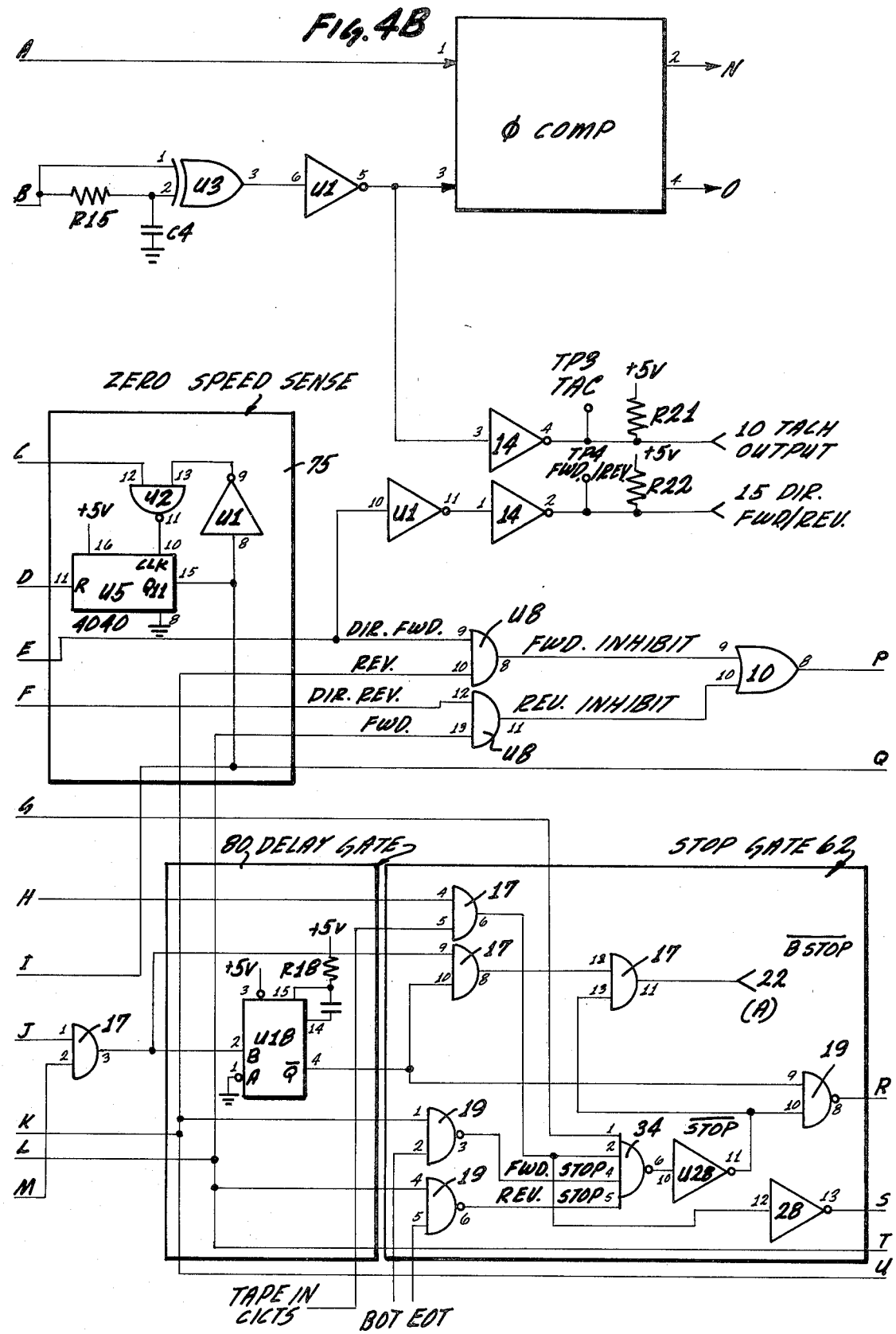

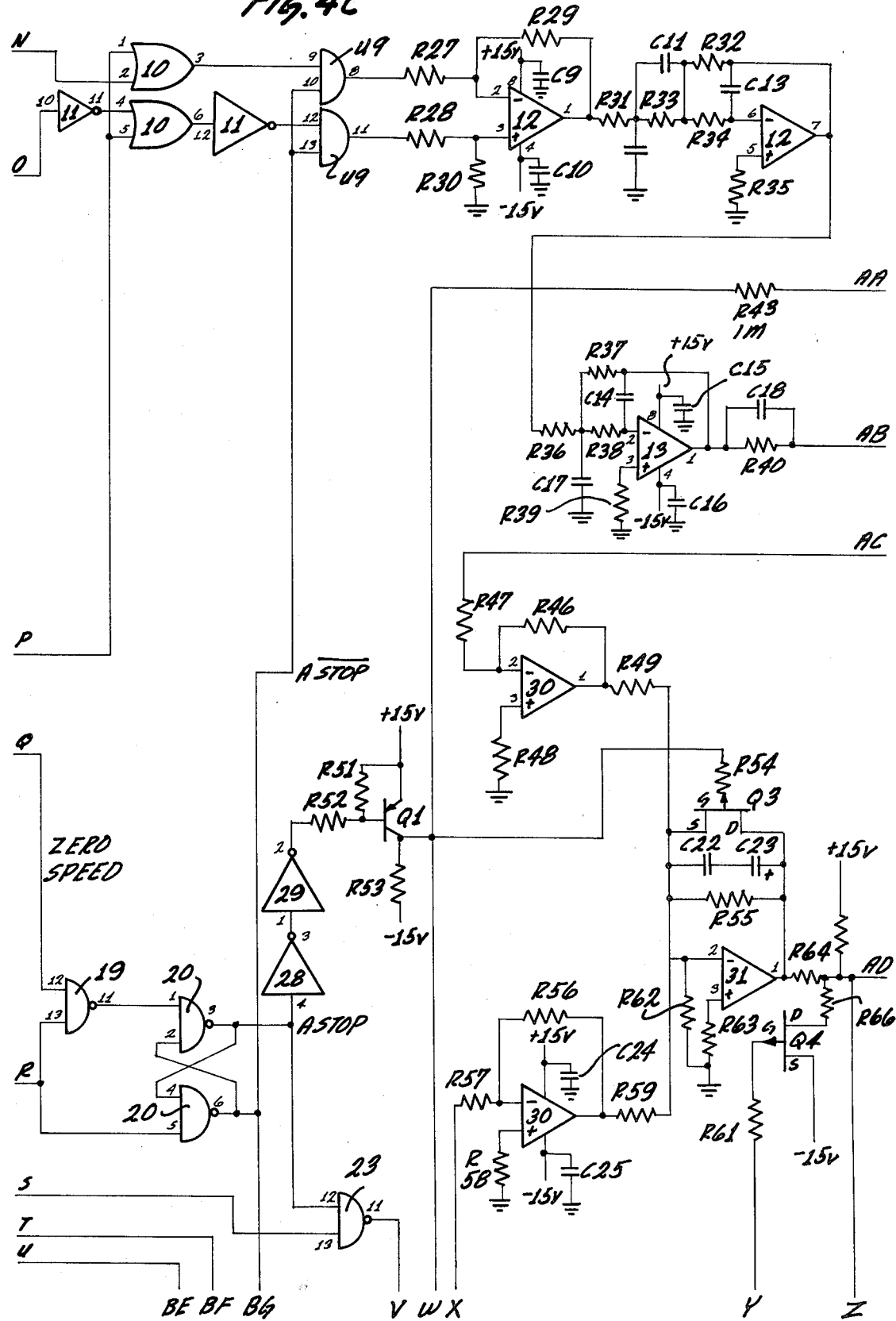

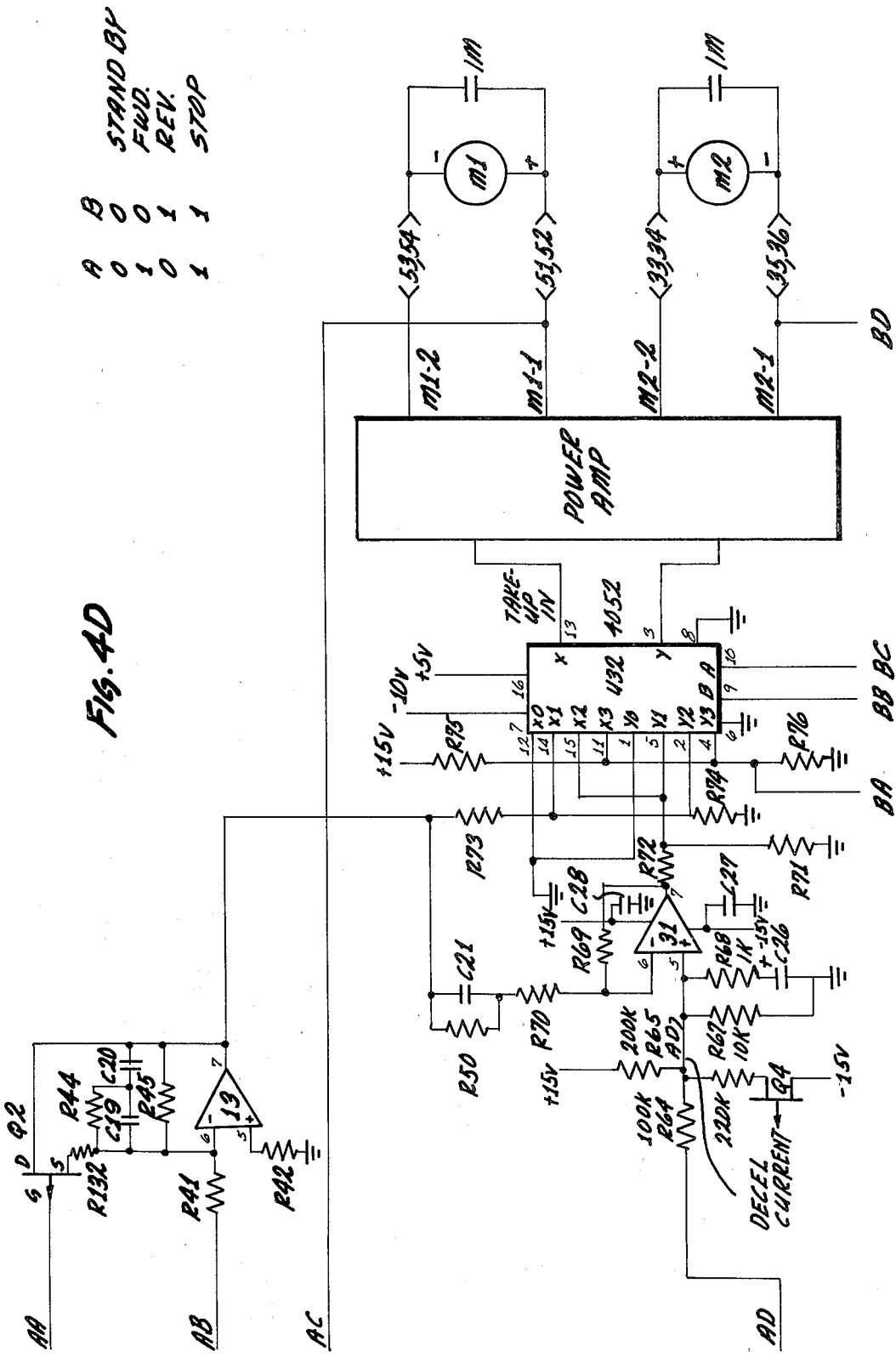

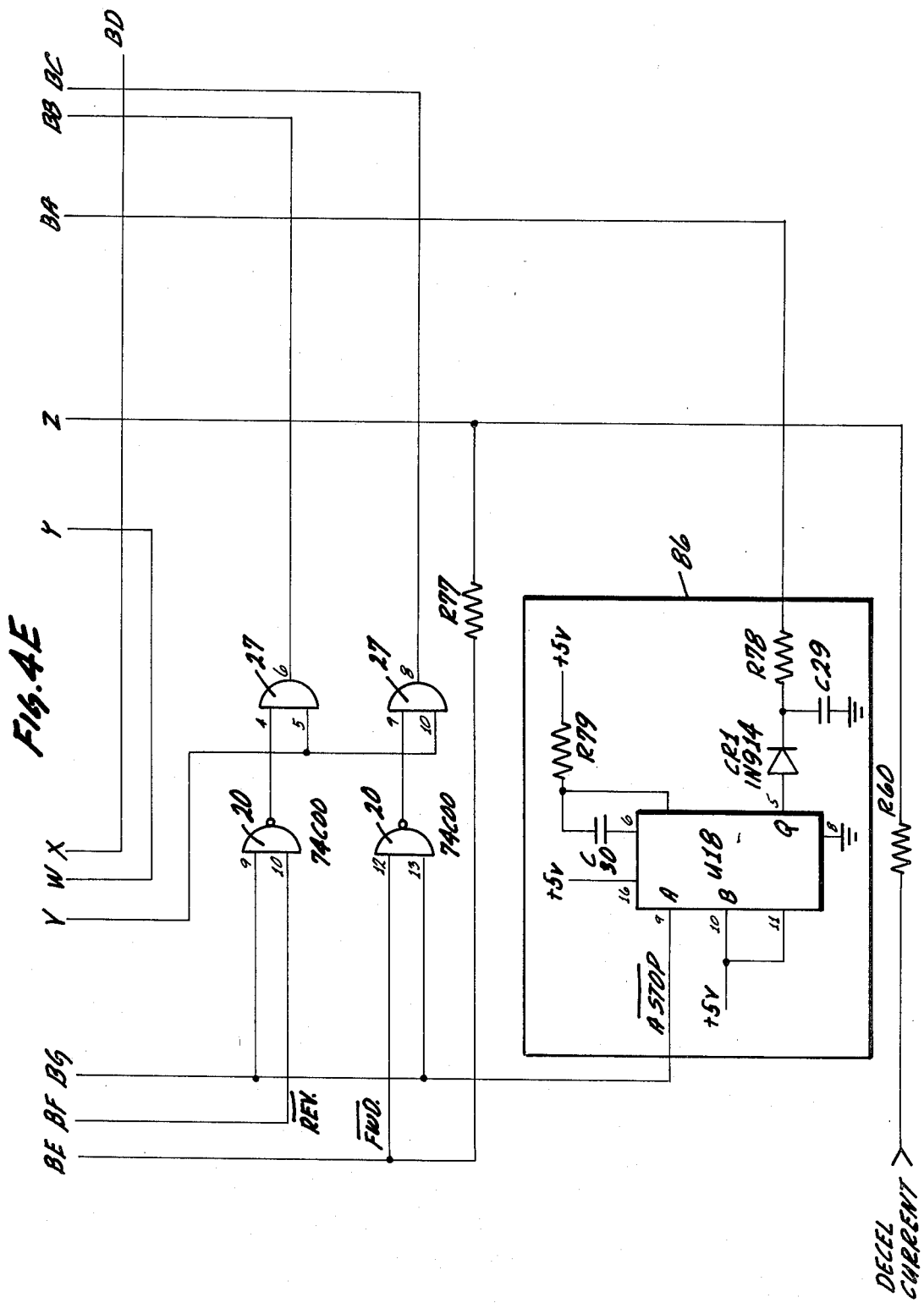

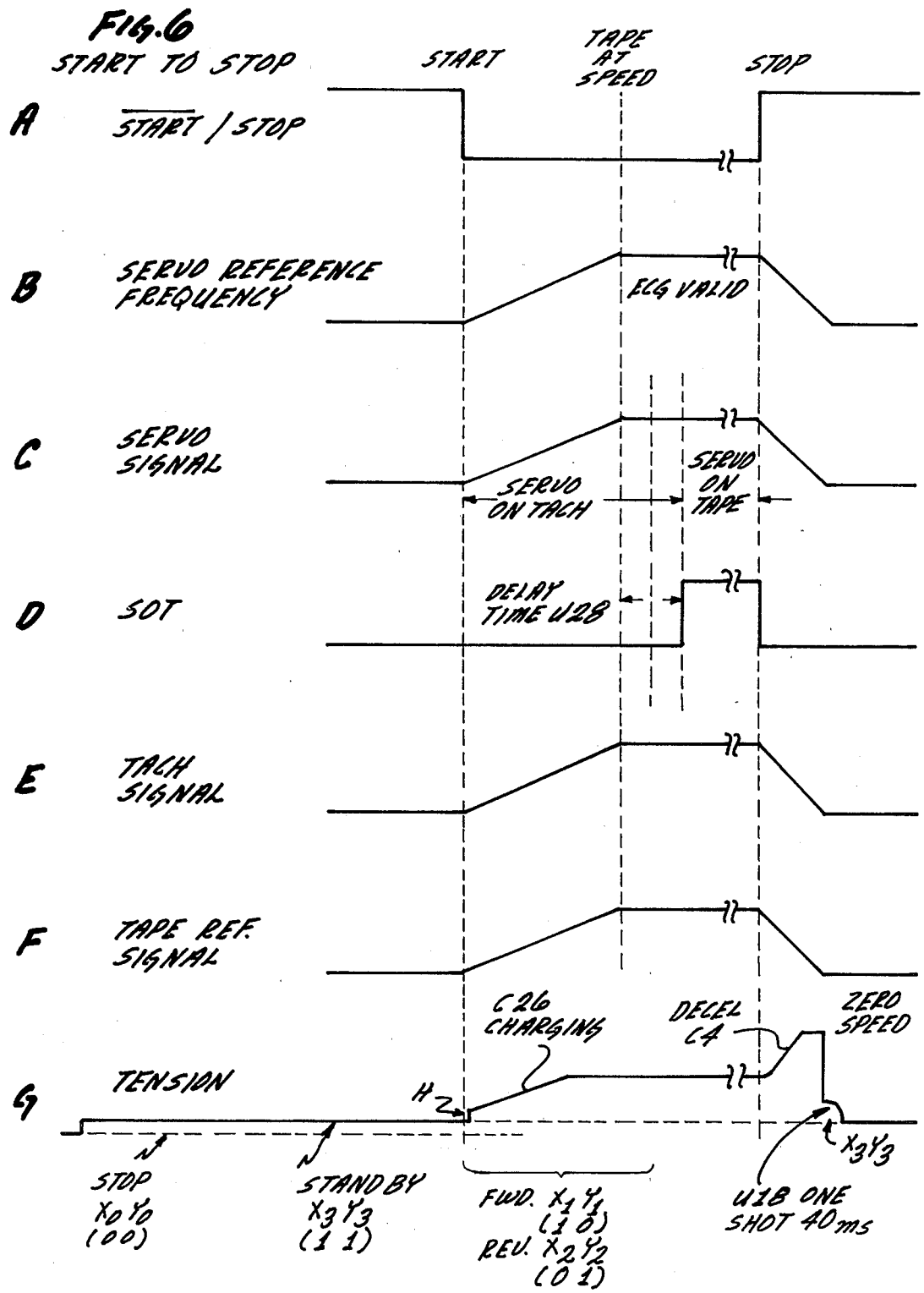

TAPE TRANSPORT

BACKGROUND OF THE INVENTION

This invention relates to magnetic tape transports and more particularly to a tape transport system and method adapted for use in high density data storage of either digital or analog data. As used herein tape transports and tape recorder will be used interchangeably and include tape players. Tape recorders and similar devices in which a spool of tape is moved from one to a proximate reel past a record playback magnetic head which either impresses magnetic signals on or receives magnetic signals from the tape. Movement of the tape strip between the reels has heretofore been achieved using a constant speed linear movement mechanisms using either a capstan drive or a reel drive. While the capstan drive is relatively easy to implement and works well in constant speed applications it is not very well adapted in variable high speed high information density uses, particularly where constant search and locate functions are demanded, as in data retrieval.

U.S. Pat. No. 4,163,532 issued Aug. 7, 1979, to Yoshikai Sakai discloses a transport adapted for data cassette use employing a variable speed motor drive, a velocity sensing take-up drive governed by speed sensing wheel moved by the tape and the dynamic supply drive. The latter forming a velocity tack loop by which the absolute speed of movement of the tape is controlled. A tape tension control is also provided by energizing the supply side of motor, however, the Sakai system is not adapted to absolute control of the tape speed as a function of an accurate timing thereof based on the origin of the signal being recorded, nor is it adapted to control the tension of the tape so as to maintain a constant value.

A phase-lock loop take-up drive has been known for speed control of a capstan driven system, Horak et al, U.S. Pat. Nos. 4,218,713 issued Aug. 19, 1980 and Rotter et al, 4,123,773 issued Oct. 30, 1978. A recorded signal on the tape has also been used as a tape drive speed reference, see Hamilton U.S. Pat. No. 3,596,005 issued July 25, 1971 While these prior art patents do provide a solution to the speed control problem in magnetic tape recording they fall short of achieving a general solution in that their resulting access time is limited, in the case of capstan systems and their speed accuracy depends on the speed accuracy of the original recording itself or on the speed accuracy of a reference track. Furthermore, none of the prior art referenced patents discloses a sufficiently accurate dynamic tension system controlled by a function corresponding to a measurement of tape tension itself. There is therefor a need for an improved transport system for magnetic recording and playback.

In general, it is an object of the present invention to provide an improved tape transport system and method which will overcome the limitations and disadvantages.

A further object of the invention is to provide the tape transport of the above character which achieves a high data packing density which, can be readily operated in fast scan modes and possesses high data recovery accuracy while in such modes.

A further object of the invention is to provide a tape transport system of the above character in which tape handling during scan and search modes is accomplished using a tachometer reference phase-lock loop and in which tape handling during signal processing is accomplished using a tape to signal accurate reference, the accuracy of which depends solely on the combined accuracy of the tape reference signal and the phase-lock reference, independently of the absolute accuracy of the tape transport movement, tape elasticity, and other variables.

Another object of the invention is to provide a tape transport system of the above character in which tape acceleration and deceleration circuits provide tension control which electronically sums the tension in the tape and acts to maintain that tension constant at all times, except for rapid deceleration.

Another object of the invention is to provide tape transport system of the above character which is completely bi-directional and operational.

The present invention relates additionally to medical electronics applications for which purpose it was first developed. In that connection reference is made to U.S. Pat. Nos. 3,215,136 issued Nov. 2, 1965 to Holter, to 4,073,011 (now Re. 29,921) issued Feb. 7, 1978; 4,123,785 issued Oct. 31, 1978 to Cherry et al to 4,127,571 issued June 5, 1979 to Shu, and to U.S. patent application Ser. No. 192,192 filed Sept. 30, 1980, in the names of Anderson, Cherry, Ripley and Tanaka, all of which are assigned to the same assignee as the present application.

In recent years considerable progress has been made in recording and analyzing of electrocardiac signals obtained from a patient, particularly an ambulatory patient. Thus, in the Holter technique, the patient is provided with a small portable tape recorder on which his cardiac signals are recorded over an extended period of time as the patient goes about his daily activities. Such signals are usually continuously recorded over intervals up to 24 hours on a single tape, using tape speeds as low as 1/16 of an inch per second. Since it would be prohibitively expensive to examine an entire 24 hour recording at real time speed, such tapes are normally scanned at much higher speeds on special high speed scanners, such as that described in U.S. Pat. No. 4,006,737 entitled "Electrocardiographic Computer" issued Feb. 8, 1977 to Cherry as modified by such improvements as in U.S. Pat. No. 4,157,571. Thus, the playback scanner is provided with a capability of displaying a signal at various speeds and in addition the ability to freeze displayed action for extended study. The electrocardiac signals have a significant frequency component in the lower audio range so that the design of playback heads capable of satisfactory operation at high speed and at real time playback speeds is difficult. As a solution, scanners have been developed which permit a segment of the signal on the magnetic tape to be frozen in a display and advanced or reversed in various slow speeds without relying on particular magnetic head considerations. As will be understood from review of the referenced patents and patent application, the ability to start and to stop and to proceed at varying scan speeds is a requisite of these recording techniques. In addition, the high packing density of ECG signals, within 0.010 of an inch, and requisite time accuracy of the resultant signal in display time necessitates a very accurate recording and playback system. It will be further understood that such a tape transport system must be useable under circumstances providing for ambulatory movement of the patient in which the recording device is both battery operated and subject to constant movement and acceleration with the patient's body and thus, subject to speed fluctuations both for that reason and because of battery powered operation. As mentioned in scanning such tapes the stop, reload data, and scan at speed signals must be implemented over the range from real time to 240 times the real time and higher. That coupled with the position and time accuracy required to single out an ECG complex on the tape requires tolerances heretofore unavailable. By way of example, even tape stretch during acceleration and deceleration can amount to a significant movement of the position of an ECG on the tape.

Accordingly, it is desired to provide a tape transport system in the present invention in which positional accuracy of recorded signal segments on the tape is no longer relied upon and tape stretch will not affect, within limits, the useful accuracy of the tape transport of this invention.

In the present invention absolute positional accuracy is not required. In the take-up reel drive circuits, as set forth herein, a phase-lock loop drive is used and referenced to a tack signal drive from tape movement during periods of speed change and stop mode. Speed change is affected by a ramp generator and VCO which shift speeds smoothly and gradually after which, when at speed, the phase-lock loop take-up drive is shifted to a reference signal of accurate time which is recorded on the tape simultaneously with the recording of the data or information signal. By so doing any speed variations and tape stretch becomes removeable during playback by continuing speed regulation of the tape to maintain the time signal constant against the crystal control time signal of the phase-lock loop circuit. In addition to the foregoing current a second servo loop is employed for controlling the supply reel drive motor. This loop is controlled in part by a current sensing circuit which senses tape tension electronically and fixes the tape tension as a constant input drive to the supply reel. Other supply current drives include a constant braking bias signal and a compensation feedback signal derived from a portion of the take-up reel drive. In addition, a special deceleration current is employed for rapid stopping of the system.

Accordingly, it is a further object of the invention to provide a tape transport system and method of the above character which is particularly adapted for recording ECG signals on magnetic tape and for playing back the same with a high degree of time accuracy irrespective of the positional accuracy of the tape during various record and playback operations.

A further object of the invention is to provide a tape transport system and method of the above character in which the tape tension is computed in a servo loop for controlling supply reel movement in relation to take-up reel movement, such that the tape tension tends towards a constant value.

SUMMARY OF THE INVENTION

The magnetic tape transport system of the present invention includes recording an accurate reference time signal and a data signal simultaneously on a moveable magnetic tape. The tape is played back on a motor drive transport controlled by a phase-lock loop circuit having a second accurate clock for establishing playback speed. The transport movement is synchronized against the referenced signal from the second clock by a phase comparison with the recorded clock signal on the tape, to thereby cause the tape speed to vary during playback such as to maintain the tape playback speed at a varying level in compliance with a constant time playback of said tape recorded reference signal. In accordance with the foregoing it will be observed that both the variations in the recording tape speed, which may be unavoidable, variations due to tape physical compliance with exerted forces, such as stretch and hysteresis, and variations due to playback equipment mechanical considerations are all eliminated, leaving the data signal to be played back in and dealt with in accurate real time during playback.

In addition, the foregoing is implemented in a tape transport system which the supply reel is provided with a servo control loop having at least one input which comprises a current sensing circuit which sums the current from both the supply reel and the take-up reel motors, divides the same by two and equates the same to tape tension. Thus, the system tends towards maintaining a constant tape tension during various acceleration and deceleration modes encountered during operation.

In addition, circuits are provided for establishing a basic supply brake bias as well as for imparting an acceleration component to the supply reel which follows the take-up reel demand.

These and other objects and features of the invention will become apparent from the following description when taken in conjunction with the accompanying drawings of which:

BRIEF DESCRIPTION OF THE DRAWINGS

FIGS. 2A and 2B are a schematic block diagram of the tape transport control circuits of the system of FIG. 1.

FIGS. 3A through 3F, 4A through 4E, and 5 are detailed circuit diagrams of the tape transport control circuits of FIGS. 2A and 2B.

FIGS. 6A through 6G are graphs showing various signal values taken at significant reference points throughout the circuitry of FIGS. 3 and 4. FIG. 6G illustrating the effects of tension experienced by the tape during the start and stop cycles.

DETAILED DESCRIPTION OF THE PREFERRED EMBODIMENT

Figure 1:
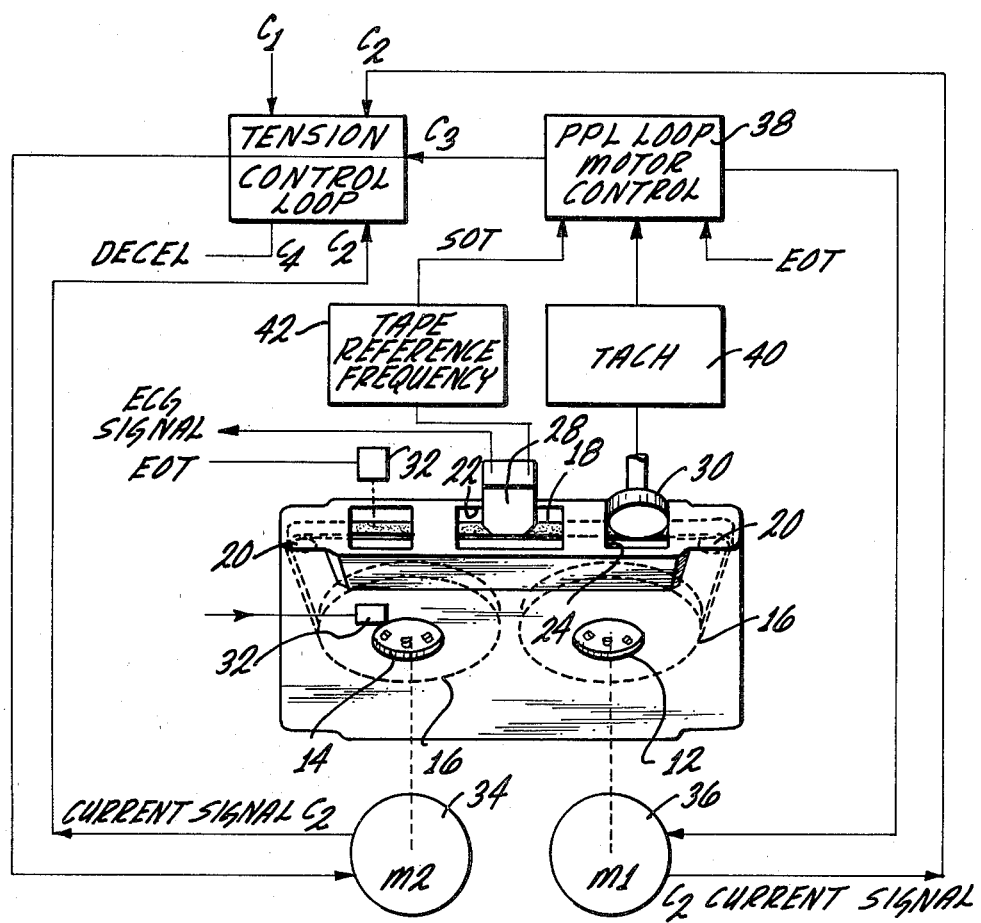
FIG. 1 is a schematic diagram of a tape transport system constructed in accordance with the present invention.

FIG. 1 schematically shows the tape transport of the present invention including a magnetic tape cassette 10 suitably mounted on the platform for supporting the same in the usual manner. The cassette includes a take-up reel 12 and a supply reel 14 having a spool 16 of magnetic tape loaded thereon and extending along a tape path 18 defined by rollers 20 and extending adjacent to one side of the cassette housing. The housing is provided with openings 22, 24, 26 for permitting the tape head 28 and a tachometer wheel 30 to access the tape and also for facilitating operation of a light operated end-of-tape (EOT) sensor 32 to shine through a transparent window defined in the tape leader ends. The output of the tach wheel drives the tachometer signal generator for producing two signals $\emptyset A$ and $\emptyset B$ which are out of phase with each other. The tape sensor output (EOT) is an on/off signal which is governed by passage of light through the transparent leader on the tape. The magnetic head is of conventional construction having high indensity magnetic gaps suitable defined to arrange signal channels on the tape as the same passes.

One of the signal channels is a reference frequency channel, while the other channel or channels relate to the recording of signal information such as an ECG signal. It will be understood that when the tape is recorded, which may be on battery operated portable equipment, that an accurate time reference signal channel is impressed thereon, so that any wow, flutter or other speed variations will be impressed upon the signal and the reference track simultaneously. By means of the invention disclosed herein the speed of playback of the tape is so governed as to introduce a variation in playback which nearly exactly cancels those which occurred in recording. To this end the magnetic head has an SOT (signal on tape) output which is alternatively used as the reference for governing tape during information signal playback. During tape start up and stop as well as during speed change cycles the tach signal is used as the reference signal.

Movement of the tape between reels is solely governed by identical variable speed, reversible DC motors 34, 36 having their output shafts directly coupled respectively to hubs engaging the take-up and supply reels 12, 14. While the nature of an ECG Holter recording is such that a cassette is recorded in one direction only, the presently described tape transport is arranged and described for tape playback movement at an speed in either direction.

Figure 2A:
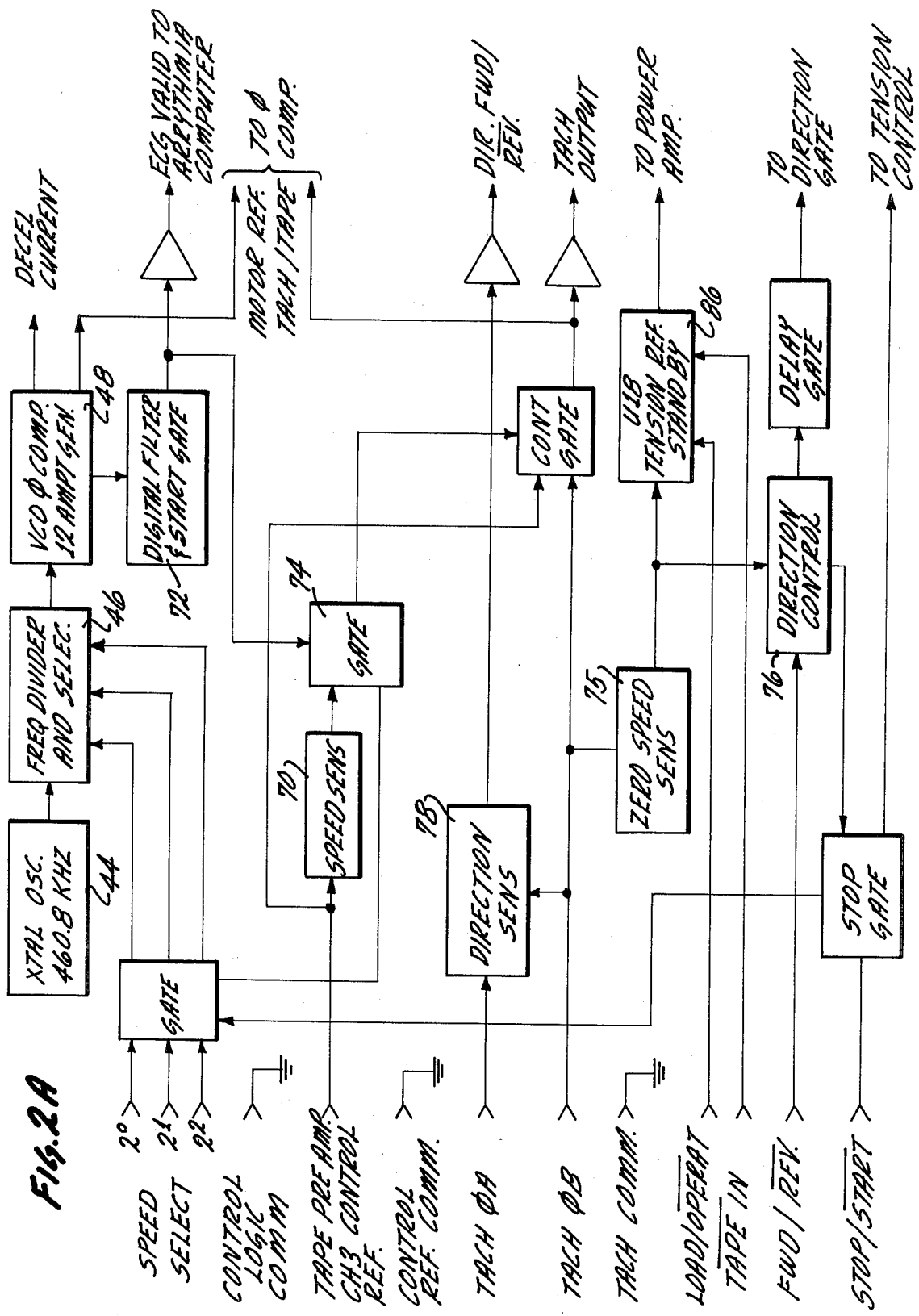

Referring also to the block diagram of FIGS. 2 and 2B a PPL (phase lock loop) motor control circuit 38 references internally to a crystal controlled oscillator 30 and compares it with either the tach signal 40 or the tape reference frequency 42 to derive a take-up drive output signal for operating the take-up motor in a closed PPL servo loop. The loop includes one of motors 34, 36, either tach 30, 40 or tape reference 42 and the PPL 38 which includes an accurate clock 44 and divider 46 which serves to establish constant demand speed, a VCO phase comparator and ramp generator 48, a steady state phase comparator 50 and a signal filter network and 52 as well as current power amp 52 for driving the motor.

The supply motor is driven by a tension servo control loop includes a tension control amplifier 60 having inputs consisting of current sensing signals consisting of a tension summing current C1 derived by adding together the total current being used in both motors, a steady bias current C2 (constant brake), a drive current C3 and $\Delta C_3$ which follows the take-up motor drive, and a deceleration current C4 used for fast stop. The tension control loop also includes both motors 34, 36, the tape spools 16 and tape section 18, buffer amplifier 62, as well as both current power amplifiers 64, 66.

Referring now to FIG. 3, the DC motors 34, 36 are each driven by DC current amplifiers one of which is shown as a detailed schematic in FIG. 3 by way of example. The motors are reversible and interchangeable as are the amplifiers. Each power amplifier receives a drive signal input from a reversing switch MUX U32 controlled by direction demand gate U20 and U27. The input voltage level to each amplifier is converted by an input current drive amplifier U33 which drives matching current drive transistors Q6 and Q7, one for the positive and one for the negative signal between which is a small dead band zone determined by the emitter base drop. R86, R87 are input voltage dividers while R90, C41 comprise a feedback loop to smooth out the performance of U33 and Q6, Q7, in passing through zero drive current input signal. Q5 and Q8 provide short circuit protection so that the amplifiers are shut down whenever the voltage drop across R106, R107 exceeds a predetermined value. Q9 and Q10 are drivers for power transistor amplifiers Q11 and Q12 to which the motor is connected. C44 is a feedback capacitor which helps close the feedback loop with respect to the current drive amplifier circuit described. By using current drive amplifiers, speed changes of up to 400 to 1 can be accomplished by merely changing the input signal demand and without changing any component values. The current drawn by each motor is measured by the voltage drop across R96 ($\frac{1}{2}$ ohm) used as a tension feedback signal to control the supply reel tension loop and supply reel drive buffer amplifier U30 from which the current signals are added in summing amplifier U31A to derive signal $c_1$, at the summing junction of R64 and R67. A steady DC bias or brake current $C_2$ is also supply by the divider network R64, R67. U31B is a summing amplifier for subtracting out a variable component $C_3$ and $C_3$ related to the magnetitude and instantaneous change in take-up drive current. The steady state component $C_3$ passes through R50 and R70 while the instantaneously changed value $\Delta C_3$ bi-passes R50 through C21. The resultant output drives the supply reel in opposition to resultant signals C1 and C2. By way of summary the drive signals to the supply motor are based on the sum of $C1+C2-(C3+\Delta C3)+C4$. C4 is a momentary deceleration drive current which serves to bring the machine to a rapid stop when the stop signal input is received. Thus, it has been found that the current which passes through both motors when taken together, are found to be a constant, because the total current running through the system is equal to the tension running on the tape, absent friction. Q3 serves to discharge capacitor C22 and C23 upon sudden stopping or starting of the system. These capacitors serve to integrate the input current signals C1. Similarly Q3 and Q4 are starting and stopping gates for discharging integrating capacitors, so as to not leave any charge residue after stop cycle has been executed. In this way the system starts from zero current at the beginning of tape movement. Capacitor C26 controls the starting current so that when first turned on it is slowly charged up to provide a slowly increasing tension and to avoid any jerk in the beginning of the take-up reel motion.

Thus, the modification of the tension loop servo by the addition of C3 is proportional to the take up drive but at a reduced level. In this way both the take up reel and the supply reel are driven together by the take up reel drive so that they operate in unison as that drive signal is changed. While the use of C21 to provide a fast changing input directly R50 has been described it should be understood that both R50 and C21 may be eliminated and the result in drive component merely applied across R70.

Referring now to FIGS. 3A through 3E the speed regulation circuits of the present invention and a portion of the take-up reel phase-lock loop drive circuit is shown in detail and consists of a crystal controlled oscillator 44 having a 460.8 kiloherz output which drives a frequency divider 46, the output frequency of which is taken at pin 5 of Q12 to a phase comparator 48, the other input of which at CC receives the VCO 48 output. The phase comparator output is taken to a ramp generator consisting of U35 and a DC current amplifier U34 which is part of element 48. More specifically, the take-up reel zero is controlled by the frequency oscillator 44 and the speed select gate permitting speed changes from 1, 2. The ramp generator is provided that a slow transition ramp can be developed for the output frequency of the VCO to catch up with the demand input frequency. Once they are synchronized, they are then phase locked together, so that the VCO will stay in phase and synchronization with the input frequency. Thus, if the frequency input is F1 and the output frequency is F2 the ramp generator will change from F2 to F1, the rate of change being determined by the RC time constant of the amplifier, i.e. C14 and R49 and R48, the latter being controlled by the voltage applied across it and Zener diodes VR4 and VR3. The diodes are back to back so that the positive one is for deceleration while the negative diode is disposed to control acceleration. The acceleration rate is slower than the deceleration rate. The phase comparator U18 together with two flip-flops U19 are arranged so that the flip-flops memorize whether there is a bit difference of one bit too fast or one bit too slow in comparison of the two input frequencies. The reference frequency and the VCO output are fed to the other side of the VCO comparator from pin 1 of U18 and the feedback output 3 on the VCO at U17. The rate of change is amplified with the integrator capacitor C14 of amplifier U35, together with the resistors R49, R48, R50 and the Zener diode which controls the voltage driving the integrator, which is formed on U35B. The output of U17 is a square wave signal having a frequency which is exactly equal to the input reference frequency once it achieves catch-up and becomes in-phase. The difference in-phase during transition is an error voltage which is amplified by U35 control integrated and then fed back to U17 through Q1, Q1 serving as a constant current generator to run U17 and give it greater dynamic range. The reference oscillator output is designated as a motor reference signal which is derived from gating the output of the VCO with the crystal frequency input. This is done, so that even though they are in phase lock relation there is a slight flutter in the VCO loop. This is eliminated once they are in-phase, since the system switches through U21, U20, U14 and U23 to the crystal, but if it is not in-phase the VCO reference frequency controls, U20 and U23 forming a gate to switch from crystal to VCO. The values of the components are selected to provide suitable acceleration and deceleration characteristics. For example, the acceleration is selected to be 100 inches per second squared, while the deceleration is selected to be 200 inches per second squared.

A rapid deceleration current is derived from U34 which goes to a high positive voltage during rapid deceleration. In response to a stop signal it is desired to shut the system down very rapidly so that a burst of current to the supply tension loop labeled decel current is used to bring the system to a complete stop.

It should be noted that even at a zero speed condition a low frequency of about 400 to 470 herz is applied to the circuits so that they are operations at all times. As soon as a start command is issued, say at 240 times real time, a control signal appear at U35, pin 1, which instantly goes to a high voltage. This causes the oscillator to start to ramp up from a position at nearly zero, up to running speed. The VCO oscillator is capable of changing to frequency input demand of 1,000 to 1 ratio, due in part to the tremendous ange of U35. C14 and R51 does provide a slight lead network for correcting the phase, as well as its usual function as integrator to U35B. U24 and U25 in associated circuitry provide a digital filter and start gate which derives a ECG valid signal indicating that the tape has achieved a steady state speed condition. The ECG valid signal is used by computer circuitry which analyzes the data signal to indicate to that circuitry that the system has achieved a correct operating speed. The output of the circuit 48 at U21, pin 8 follows the acceleration or deceleration command, such that if it is excel the signal is zero. When neither acceleration or deceleration demands are present the signal is 1 and is phase locked and not in any other stop command. This condition is termed VCO valid. These logic criteria are summed at U22, pin 12.

A speed sensing and output circuit 70 receives the control frequency reference recorded on the tape and derives a (SOT) on tape signal. Thus, when ECG valid signal occurs the system has switched to servo on tape, so that gate U2 allows the signal to go from the ECG signal to go from the tape through to the arrhythmiac computer or other analysis electronics. At the same time the phase comparator compares the reference frequency called the motor reference which comes from the VCO and whether it comes from tach or tape they are compared. The difference in phase between them is transmitted as an error voltage sent to comparator amplifier U12 which is filter comparison amplifier. A 2 pole Butterworth filter is employed with U12A which also provides lead in lagging networks for the servo control. The output of U13 is the error voltage after filtering and is used for the normal drive of the take-up motor power amplifier.

Looking at the circuits as a whole the output of the several take-up drive as it appears at comparator amp 50 is a series of pulses, the length of which is the phase angle between the motor reference and the tape output. The On is controlled by the reference motor output while the tape signal shuts the motor off. Thus the difference in phase is transmitted as a pulse width and converted in filter amp comparator amplifier 52 into a DC level signal to drive the motor, being filtered as it passes through U13 to pin 7, at which time it is roughtly a DC level voltage.

Several auxiliary control circuits for sensing various speed conditions and for implementing these conditions as desired. Thus, a direction sense circuit 78 is employed for establishing whether the circuit is operating in forward or reverse and a direction control circuit 76 implements forward and reverse commands to several of the other circuits. A zero speed sensor 70 is employed for establishing when the zero speed condition has actually been achieved. After which a delay gate 80 establishes a minimum time interval before a stop command is actually executed by stop gate 82. Also, stop commands are achieved from BOT and EOT ciruits indicating the end of the tape. In the present application the control of tape motion during acceleration and deceleration as well as during execution of stop commands must be done very carefully, so as to not have a sudden stop or sudden changes in acceleration or deceleration which would cause tape slip and stretch. Thus, a forward reverse command is executed through Q15 which serves as a memory latch, which take the input and latches until a zero speed is sensed. U15 pins 3 and 6 are summing gates for combining the forward and reverse commands with the zero speed condition, which is subsequently reflected at Q15 pins 8 and 11. Thus, the latch compares the condition of motion with the state of commands and if they are not the same, it issues a stop command at U34 which for whatever reason issued, issues a stop command output. Thus, for whatever reason there is a stop command it finally appears at U28 pin 11 which is gated with the zero speed to produce a signal called "A Stop" indicating that all commands have been received and executed. At this time the "A Stop" circuit through Q1 discharges Q2, Q3 and Q4 all capacitors in the system to return the system to a zero condition. An additional circuit at U18 provides a brief tension standby signal which operates for about 40 miliseconds at the last instant before stop is achieved. This circuit serves to place a momentary tension on the tape for the 40 milisecond interval so as to take out any slack which may occur as the system slows down to zero speed and frequency.

Figure 3A:
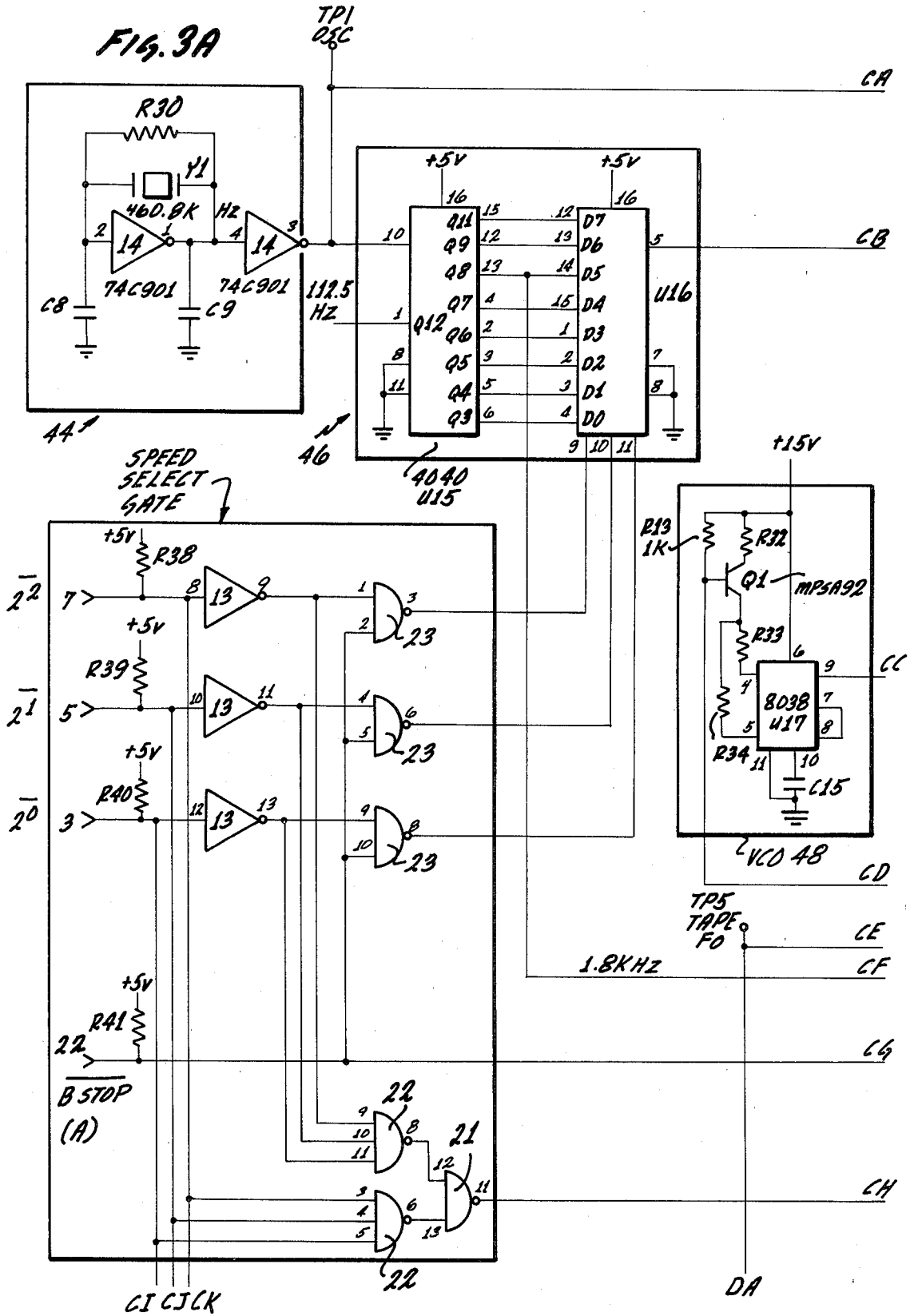
Figure 3B:
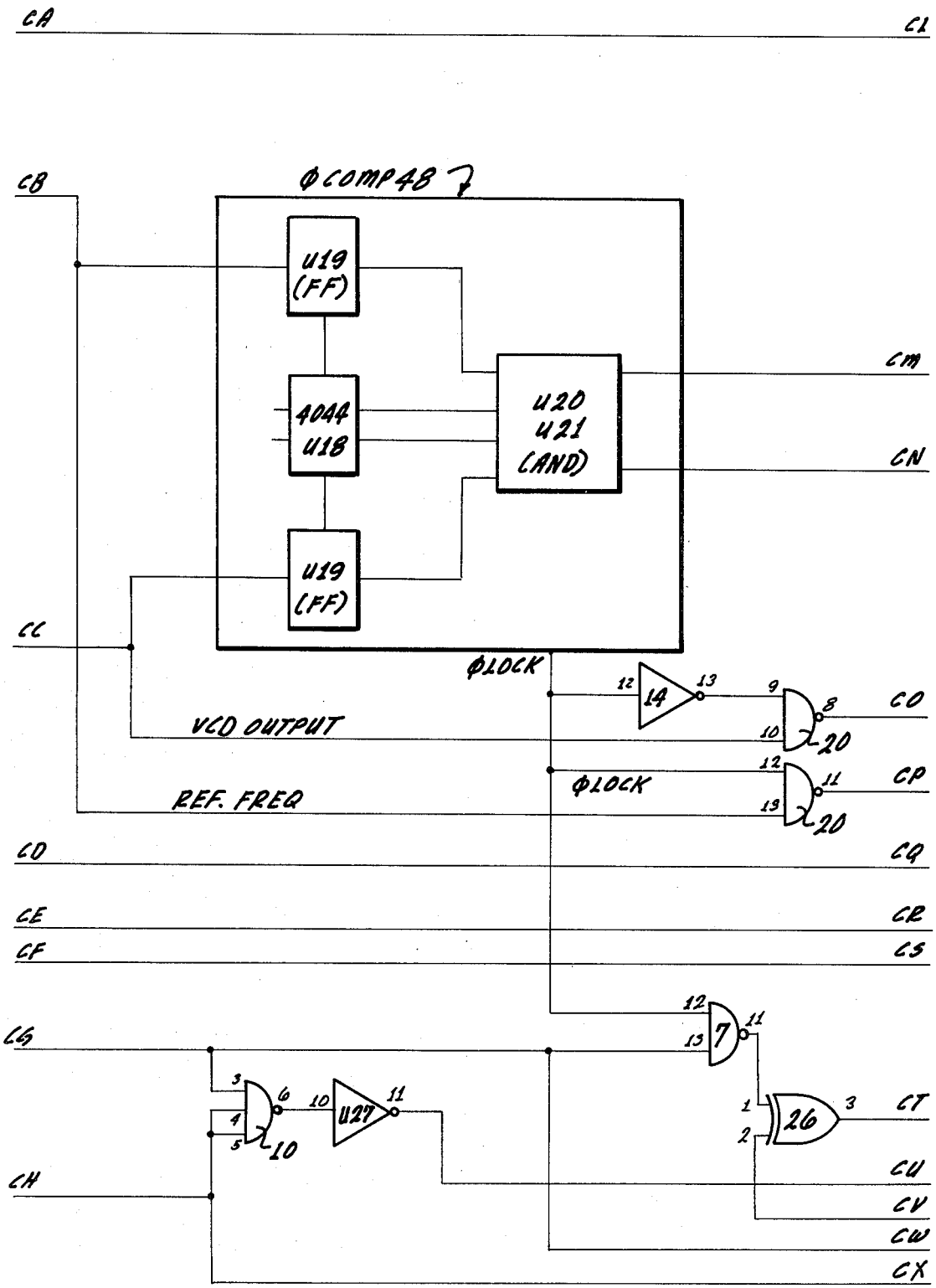
Figure 3D:
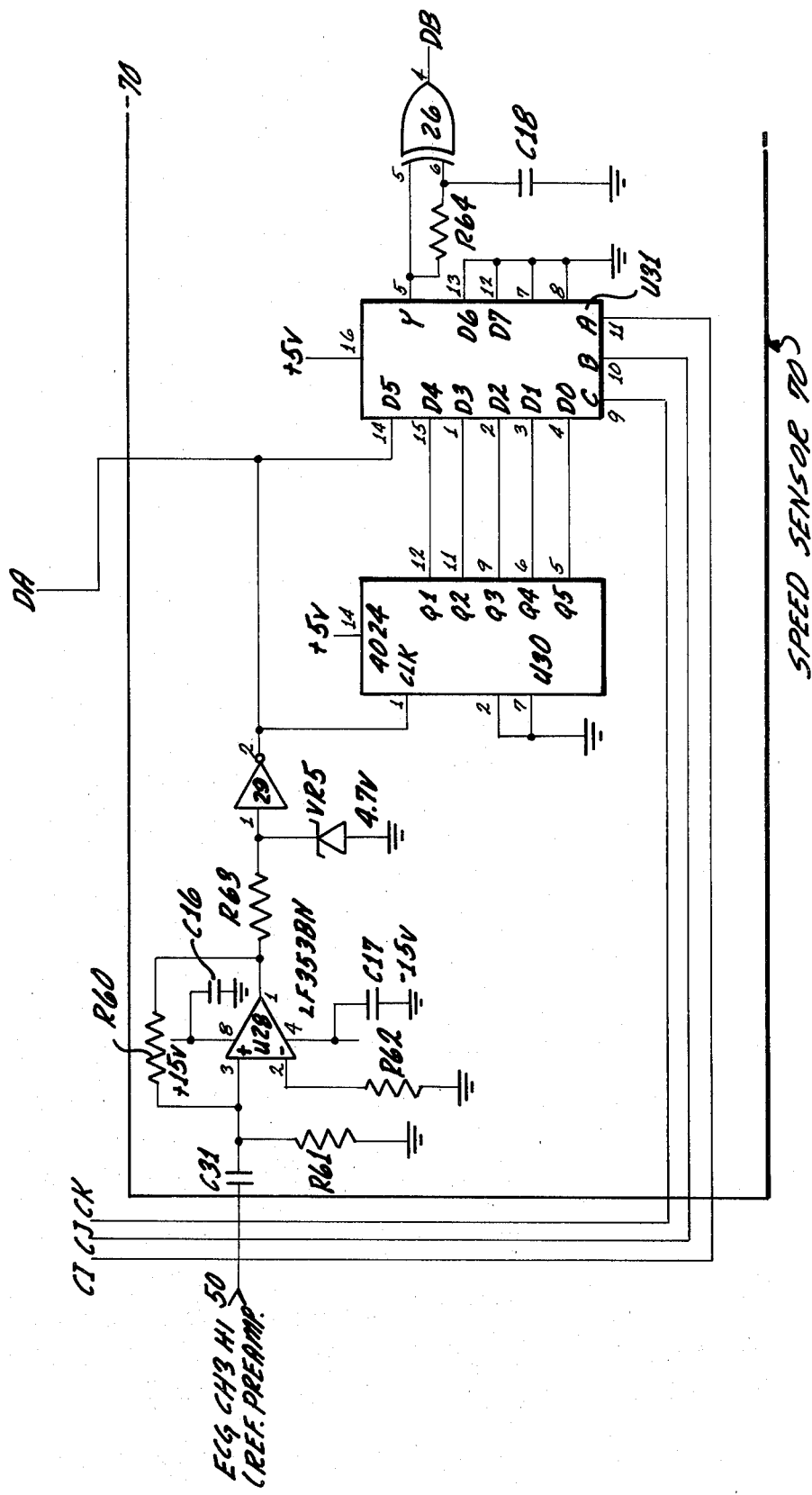
Figure 3E:
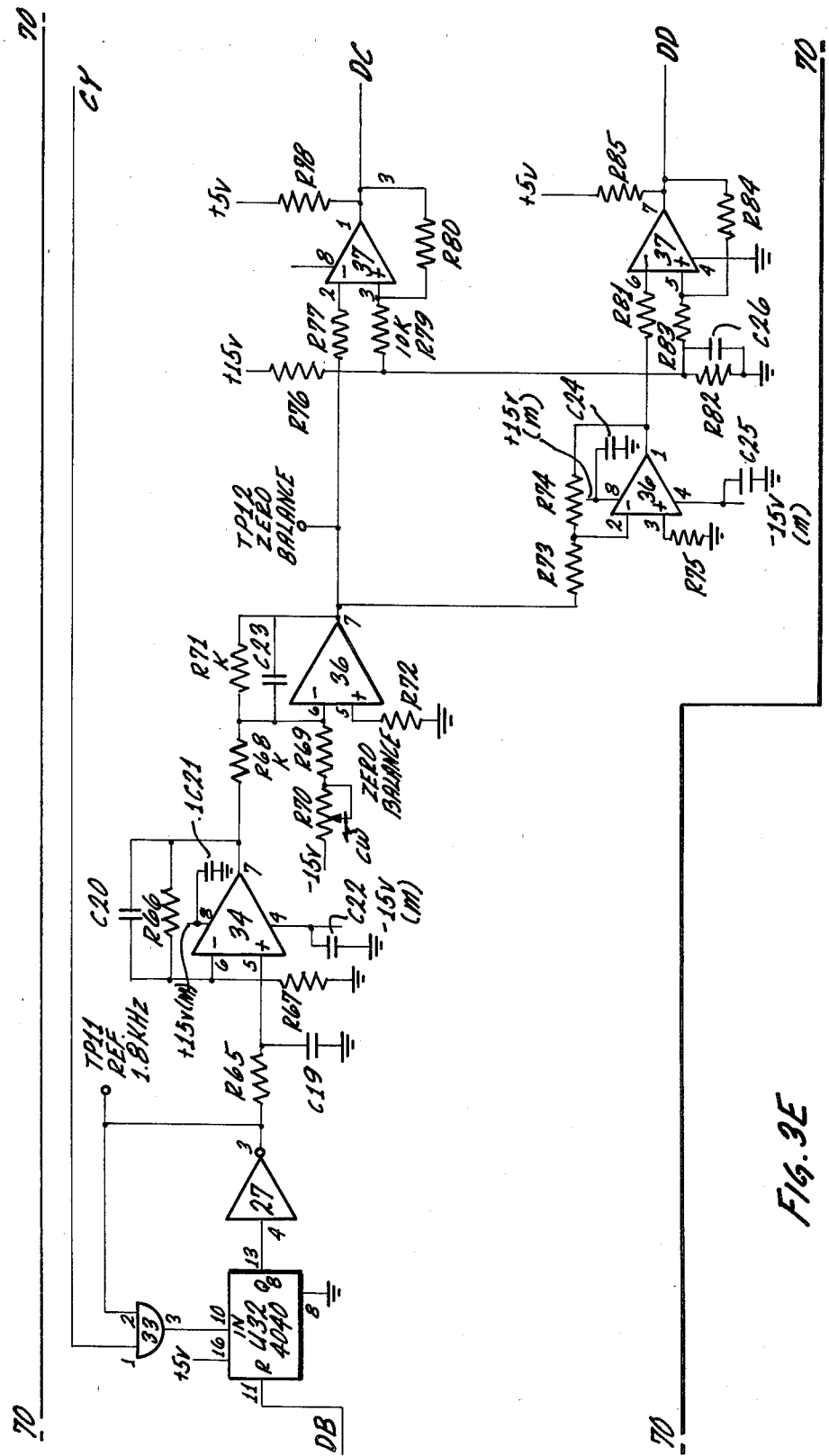
Figure 5:
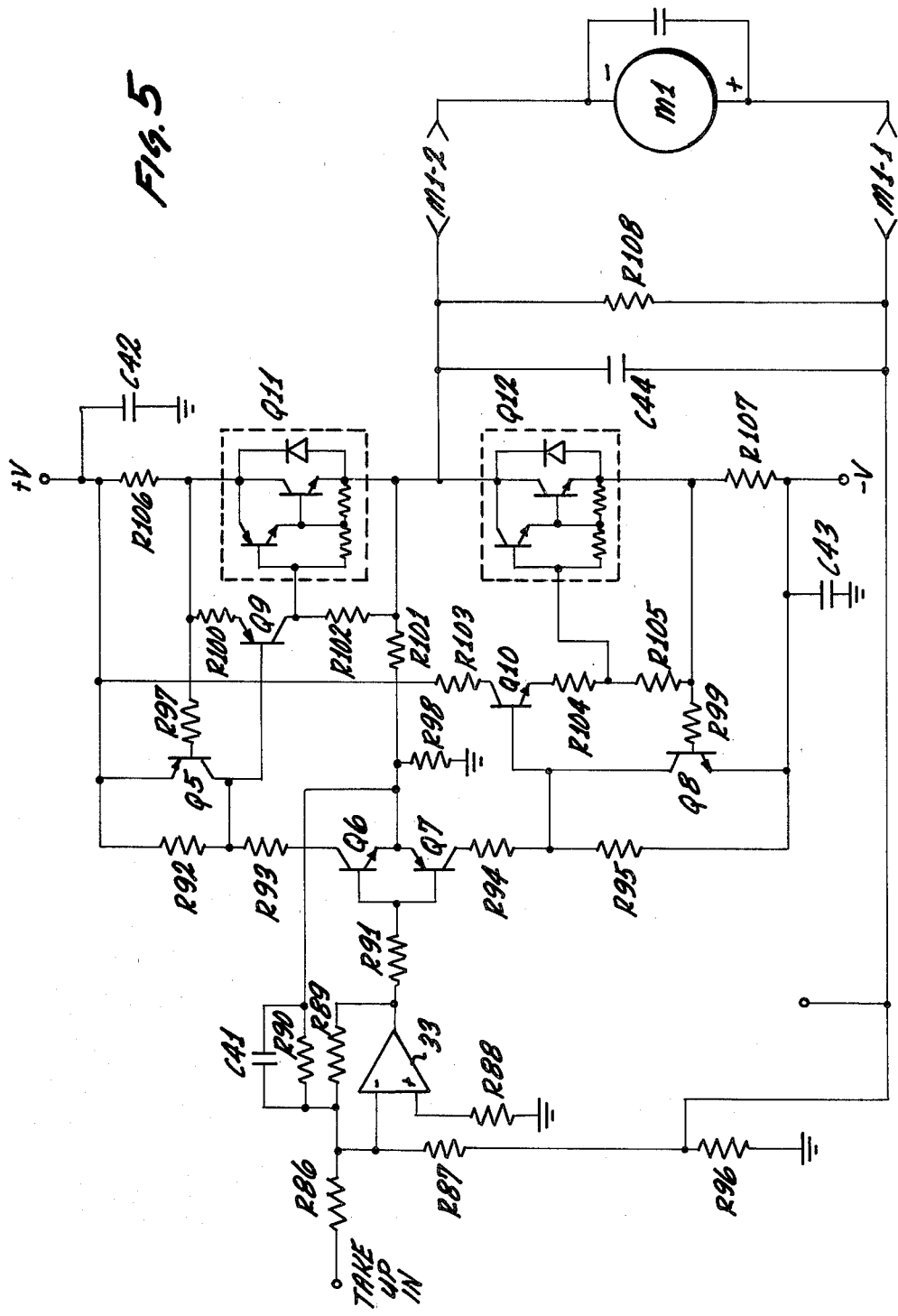

Referring now more specifically to FIGS. 3D through 3F, the speed sensing circuit 70 of the present invention is shown in detail and consists of a buffer preamplifier U28 the output of which is applied to one input of a counter U30, the other being taken to reference Fo output. U31 serves as a selector controlled by the gate speed select U13, U23 which responses to the speed select gate to deliver the same frequency for every selected tape speed. The output of frequency doubler U26 is taken through U32 which serves as a pulse width shaper circuit for delivering pulses of preselected width to U34 which serves a integrating filter for smoothing out the signal. The output of U34 is taken to a comparator U36 and compared with a reference current derived from R69 and R70. U37A and U37B are positive and negative comparators for establishing a speed sense balance. The output of U37A and U37B will be each a one when the incoming speed senses by U36 is within 10% of the zero balance established at pin . U38 serves a a delay filter which requires that the sensed speed be within the acceptable limits for a selected period of time, equal to 28 times the reciprocal of the reference frequency. When this condition has been met a control signal SOT is generated and applied to the input of gates U1 and U2 to switch the tape reference from a tachometer to the tape frequency, tape Fo.

Referring now to FIGS. 6A through G there is shown an example of various signals which appear in the circuitry of the present invention as the same as a start and stop cycle. Thus, the FIG. 6A illustrates that any given point in time a start signal is generated. This start signal appears at U1 pin 12 and drives the stop gate release at U34 pin 1 which releases the one bit stop memory of U19 and U20, the A-stop signal which simultaneously releases stop gate U9 and also VIA U20 and U27 are control gate shifts the MUX switch U32 from standby or stop to a forward or reverse direction X1, Y1, or X2, Y2 respectively. The signal serval reference frequency from a low value nominally picked at about 400 cycles which governs the initial speed of operation of ECO U17 thereafter the YCO ramps upwardly in compliance with the request of ramp generator U35. As the speed increases the servo signal FIG. 6C which appears at pin 3 of U3 ramps upwardly in correspondence to the tach signal of FIG. 6E. At the same time the tap reference signal FIG. 6F also ramps upwardly, but is not used to control the circuits. The several signals reach a plateau when the tape is at speed as indicated on the graphs; and after a delay time established by U38 the control signal is shifted from several on tach to servo on tape, where at it remains during the processing of the data signal. While a ECG valid signal could have been generated from the servo on tape signal it is desired that the system operate even if the signal on tape is poor or fails to achieve a operational signal state. For that purpose a separate ECG valid signal is generated by U25 which represents a present delay from receipt of a tape-at-speed position. In addition a reset feature is also involved in the operation of U25 should a momentary change in circuit conditions occur it will reset requiring a predetermined delay before the ECG valid condition is restored. FIG. 6G shows that the tape tension has already achieved a value as the system is shifted from a standby condition X0, Y0 to stop. During standby the tension is established by the voltage divider R75, R76. As will be noted the tension rises after the inception of the start signal and reaches a relatively stable plateau when the tape reaches speed. More specifically, the tension jumps a small increment indicated at H initially because of the voltage divider between R65 and the combination of R67, R68. Thereafter, while C26 is charging up, the tension increases until a full charge is reached and plateaus. After stable tension is achieved the current feedback loop formed through U30A and U30B takes over via voltage divider R64, R67 the tension is stabilized. After an appropriate delay established by U28 the signal is shifted to servo on tape and operation proceeds as previously described.

When a stop command is issued the servo reference frequency, servo signal, and a tach signal, and tape reference signal all decrease in accordance with the deceleration. Immediately on a stop signal the signal is shifted off of the tape and back to tach. The tension does not decrease however, but rather is increased immediately by the deceleration current C4 which plateaus at a relatively high value until a zero speed condition is sensed. At this point the control gate U20 and U27 switches MUX switch U32 back to X3Y3 condition, i.e. standby tension. For a short period of about 40 milliseconds the U18 one shot supplies a slack removing elevated tension to the system.

What is claimed is:

1. An improvement in a capstanless magnetic tape transport for controlling the movement of the magnetic tape, said tape having a reference clock signal recorded thereon and a data signal simultaneously recorded thereon, a supply reel containing said magnetic tape, a take-up reel, said supply reel and take-up reels being coupled by magnetic tape connected therebetween for movement between said supply and take-up reels, means forming a pair of spaced hubs for supporting and turning each of said reels, a take-up variable speed motor connected to said take-up reel, a supply variable speed motor connected to said supply reel, said improvement comprising:

a current drive amplifier connected to each of said supply and take-up motors for supplying driving power to each motor;

a phase lock loop (PLL) servo means for controlling said take-up drive amplifier and including a PLL clock for generating a PLL clock signal;

a first tape reference input means connected to said PLL servo means, said first reference input means for measuring the speed of movement of said tape between said supply and take-up reels, said PLL servo means being responsive to said first tape reference means and connected thereto, said first tape reference means linearly driving said PLL servo means from a start-up speed to a selected speed;

a second tape reference input means connected to said PLL servo means for reading said reference clock signal recorded on said magnetic tape and for controlling said PLL servo means so that the speed of said tape from said supply reel to said take-up reel is controlled so that said PLL clock signal and said reference clock signal on said magnetic tape are synchronized; and tensioning means for providing a tape tension servo loop said tensioning means being responsive to said driving power supplied to said take-up and to said supply motors by said corresponding current drive amplifiers, and the output of said tensioning means connected to said supply reel drive amplifier whereby tension is supplied to said tape in response to a continuously varied speed during playback, and whereby said tape speed is continuously varied during playback to exactly cancel any speed variation which occurs during original recording.

2. The improvement of claim 1 wherein said PLL servo means includes a phase comparator circuit, a variably controlled oscillator (VCO) and means for comparing a selected frequency corresponding to said selected speed with an actual frequency of operation corresponding to said measured speed of movement of said tape and for generating a ramp signal for shifting the output of said VCO from a start-up frequency to said selected frequency, and means for switching from the frequency characteristic of said output of said VCO to the frequency of said PLL clock signal when the phase difference therebetween is substantially equal, and wherein said PLL servo means generates a motor reference output signal thereafter for synchronization of said PLL clock signal with said reference clock signal measured from said tape.

3. The improvement of claim 2 further including a second phase comparator for comparing said motor reference output signal with said reference clock signal recorded on said tape and for generating an output to cause said supply and take-up motor drive amplifiers to respond to said reference clock signal on said tape during steady state operation to cause the tape speed to vary so as to synchronize said tape reference clock signal with said PLL clock signal.

4. The improvement of claim 3 wherein said tensioning means includes means for sensing the current supplied to said supply and take-up drive motors, means for adding said currents to generate a signal $C_2$ and for applying said signal $C_2$ to said tape tension servo loop to maintain a torque of each of said motors and to maintain the resultant tape tension at a constant value.

5. The improvement of claim 4 further including means for adding a signal $C_3$ to said tape tension servo loop, the value of said signal $C_3$ being proportional to current supplied to said take-up drive motor as a reduced level.

6. The improvement of claim 4 further including means for providing a signal $C_4$ for decelerating said magnetic tape, said signal $C_4$ characterized by a high current value, said means also for applying said signal $C_4$ to said tape tension servo loop.

* * * * *